US006306485B1

(12) United States Patent
Keller

(10) Patent No.: US 6,306,485 B1
(45) Date of Patent: Oct. 23, 2001

(54) DECORATIVE POP-UP STICKERS AND METHOD OF MAKING THE SAME

(76) Inventor: Sheila K. Keller, 18790 Oaktree Ave., Oregon City, OR (US) 97045

( * ) Notice: Subject to any disclaimer, the term of this patent is extended or adjusted under 35 U.S.C. 154(b) by 0 days.

(21) Appl. No.: 09/372,421

(22) Filed: Aug. 11, 1999

(51) Int. Cl.[7] .................................................... B32B 9/00

(52) U.S. Cl. ........................... 428/194; 428/12; 428/40.1; 428/134; 40/124.08; 40/124.096; 40/124.14; 40/124.16; 446/148

(58) Field of Search ........................... 428/12, 42.3, 40.1, 428/42.1, 24, 16, 194, 542.6, 132, 134; 40/124.08, 124.09, 124.01, 124.16, 124.14; 493/346, 381; 156/248, 249; 446/148

(56) References Cited

U.S. PATENT DOCUMENTS 2,099,420 * 11/1937 Cloud .
2,632,269 * 3/1953 Sanders .
3,153,503 * 10/1964 Goldstein .
4,774,780 * 10/1988 Crowell .
5,078,670 * 1/1992 Volkert .
5,181,901 1/1993 Volkert .
5,346,455 9/1994 Volkert .
5,582,888 12/1996 Volkert .
5,687,495 11/1997 Volkert .
6,068,903 * 5/2000 Volkert .

* cited by examiner

*Primary Examiner*—Blaine Copenheaver
*Assistant Examiner*—Wendy Boss
(74) *Attorney, Agent, or Firm*—Kolisch, Hartwell, Dickinson, McCormack & Heuser

(57) ABSTRACT

A decorative pop-up sticker is formed of a decorative design element bendable along an intermediate line to form design sections at least one of which has adhesive on its back side, whereby to enable securing said design sections to a surface with the bent design section extending outwardly of said surface in a pop-up, three dimensional configuration.

7 Claims, 2 Drawing Sheets

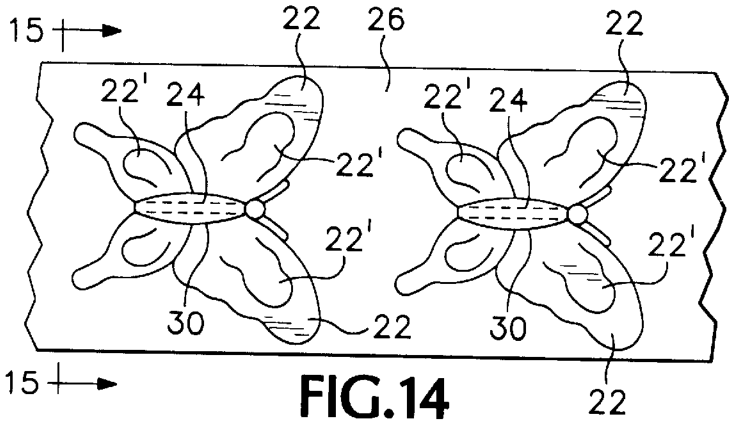
FIG.14
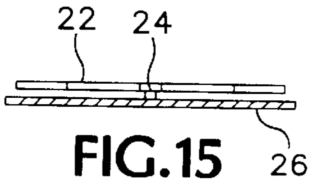
FIG.15
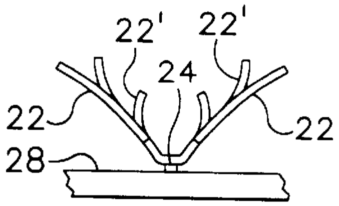
FIG.16
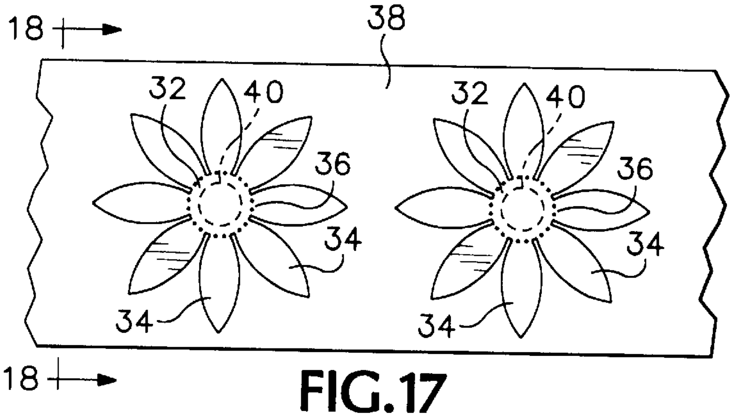
FIG.17
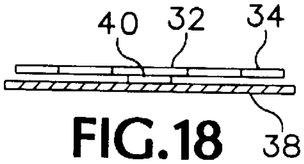
FIG.18
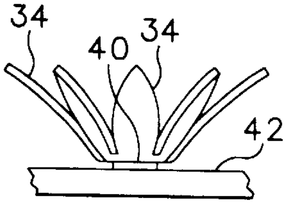
FIG.19
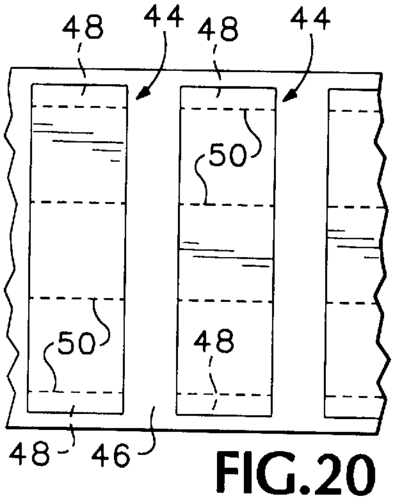
FIG.20
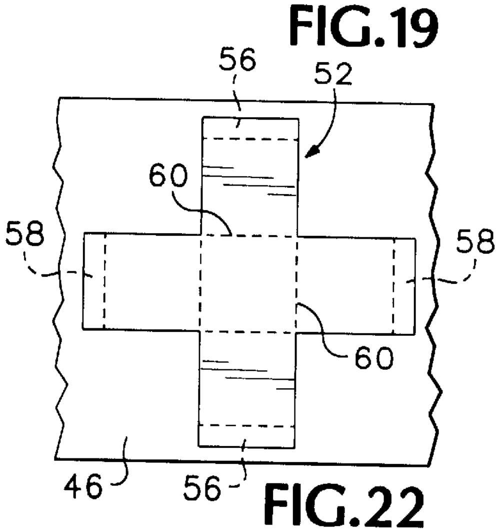
FIG.22
FIG.21
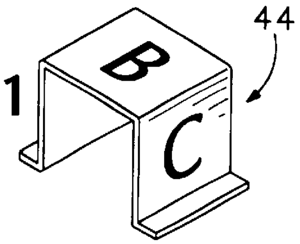
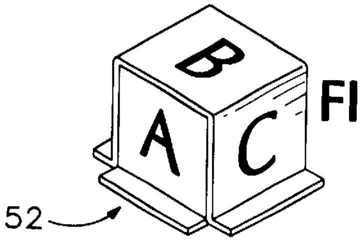
FIG.23

DECORATIVE POP-UP STICKERS AND METHOD OF MAKING THE SAME

BACKGROUND OF THE INVENTION

This invention relates to decorative stickers, and more particularly to decorative stickers that project outward from an underlying surface in a three dimensional configuration.

Decorative stickers provided heretofore are flat, thin, stamp-like objects provided with a film of adhesive over the back surface, for securing the sticker flatwise to a surface, in the two dimensional manner of a postage stamp.

SUMMARY OF THE INVENTION

The decorative pop-up sticker of this invention is a flat sheet foldable on predetermined lines and provided with pressure sensitive adhesive on portions of its underside, whereby portions may be bent outwardly and secured to a surface with unsecured portions projecting outwardly from said surface.

It is the principal objective of this invention to provide a decorative pop-up sticker that overcomes the aforementioned limitations of prior decorative stickers.

Another objective of this invention is to provide a method of making decorative pop-up stickers on an economical, mass production basis.

Still another objective of this invention is the provision of a method of making decorative pop-up stickers carried on an elongated ribbon in roll form.

A further objective of this invention is to provide a decorative pop-up sticker that may be displayed in various degrees of outward projection from an underlying surface.

The foregoing and other objects and advantages of this invention will appear from the following detailed description, taken in connection with the accompanying drawings of a preferred embodiment.

BRIEF DESCRIPTION OF THE DRAWINGS

FIG. 14 is a fragmentary plan view, similar to FIG. 8, of a third configuration of decorative pop-up sticker embodying the features of this invention.

FIG. 15 is a sectional view taken on the line 15—15 in FIG. 14.

FIG. 16 is a side elevation showing the decorative pop-up sticker of FIG. 14 secured to and bent upward from an underlying surface in an animated configuration.

FIG. 17 is a fragmentary plan view, similar to FIG. 8, of a third configuration of decorative pop-up sticker embodying the features of this invention.

FIG. 18 is a sectional view taken on the line 18—18 in FIG. 17.

FIG. 19 is a side elevation showing the decorative pop-up sticker of FIG. 17 secured to and bent upward from an underlying surface in an animated configuration.

FIG. 20 is a fragmentary plan view, similar to FIG. 8, of a fourth configuration of decorative pop-up sticker embodying the features of this invention.

FIG. 21 is a perspective view showing the pop-up sticker of FIG. 20 bent along the score lines and secured to an underlying surface to depict a rectangular arch. FIG. 22 is a fragmentary plan view, similar to FIG. 8, of an alternative to the construction of FIG. 20 to provide the toy block of FIG. 21 from a one-piece blank.

FIG. 23 is a perspective view showing the toy block formed from the one-piece blank of FIG. 22.

DESCRIPTION OF THE PREFERRED EMBODIMENT

Figure 1:
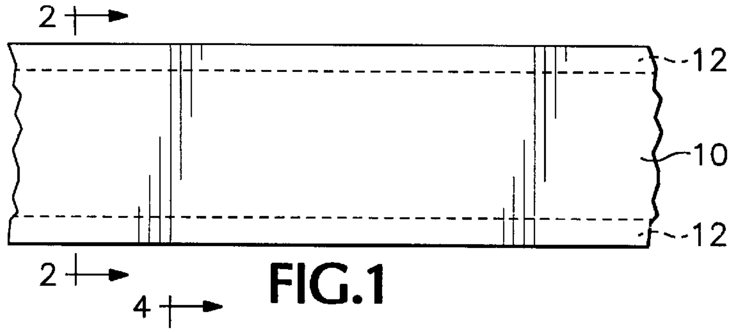
FIG. 1 is a fragmentary plan view of a length of decorative ribbon with narrow strips of adhesive shown in broken lines on the lateral sides of the underside of the ribbon.
Figure 2:
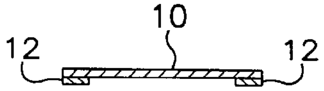
FIG. 2 is a sectional view taken on the line 2—2 in FIG. 1.

FIG. 1 shows a length of decorative ribbon 10 having applied to the underside thereof narrow strips of pressure sensitive adhesive 12 adjacent the lateral sides of the ribbon, in the manner shown in FIG. 2.

Figure 3:
FIG. 3 is a fragmentary plan view of a length of protective liner to be secured removably to the underside of the ribbon by means of the strips of adhesive.
Figure 4:
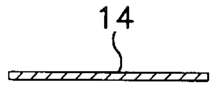
FIG. 4 is a sectional view taken on the line 4—4 in FIG. 3.

FIG. 3 shows a length of protective liner 14 to be secured removably to the underside of the ribbon 10, by means of the adhesive strips 12 which the liner protects prior to use of the sticker.

Figure 5:
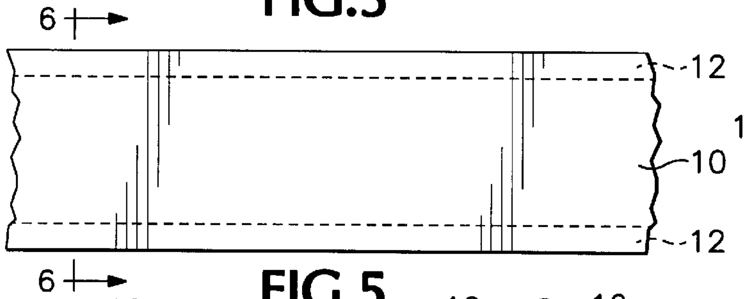
FIG. 5 is a fragmentary plan view of the assembly of ribbon of FIG. 1 and underlying liner of FIG. 3.
Figure 6:
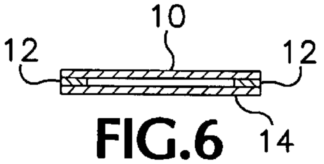
FIG. 6 is a sectional view taken on the line 6—6 in FIG. 5.

The assembly of decorative ribbon and protective liner is shown in FIGS. 5 and 6. This provides for the mass production of decorative pop-up stickers.

Figure 7:
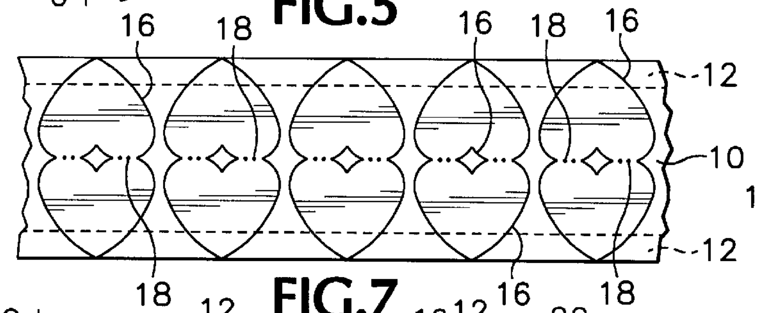
FIG. 7 is a fragmentary plan view of the assembly of FIG. 5 with a plurality of decorative design elements formed as kiss cuts through the ribbon of FIG. 1 but not through the underlying liner of FIG. 3.
Figure 9:
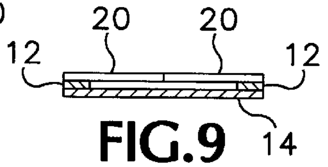
FIG. 9 is a sectional view taken on the line 9—9 in FIG. 8.

Referring to FIG. 7 of the drawings, the decorative design of the pop-up stickers is illustrated to be a heart. It is formed by "kiss" cutting the decorative ribbon 10, that is, without also cutting the liner 14. In the embodiment illustrated, the kiss cuts 16 form the configuration of pairs of hearts disposed back-to-back across the width of the decorative strip 10. The cuts may extend the full width of the strip 10, as illustrated, although they may terminate inwardly of the lateral edges of the strip 10, for the purpose described hereinafter.

Figure 8:
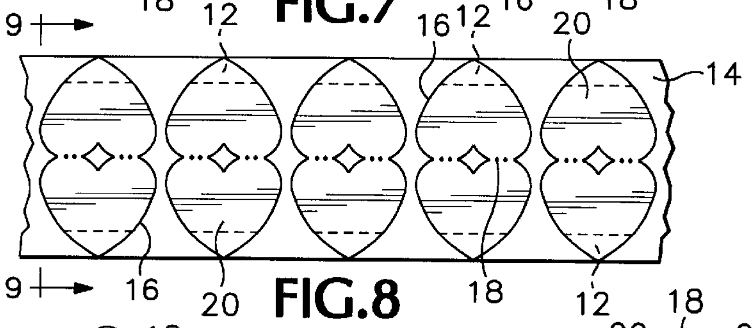
FIG. 8 is a fragmentary plan view similar to FIG. 7 with the portions of ribbon outside the decorative design elements of FIG. 7 removed from the liner.

The kiss cuts also are interrupted at the center between the pair of hearts, and the interrupted center line preferably is provided with a plurality of perforations 18 which serve to facilitate the bending of the two halves of the decorative design element when it is removed from the production strip shown in FIG. 8. It is to be noted in FIG. 7 that a plurality of the pairs of design configurations are formed by kiss cuts along the length of the ribbon 10.

After the decorative design elements have been formed by the kiss cuts illustrated in FIG. 7, the remaining portions of the decorative ribbon 10 are removed from between the decorative elements. It may be preferred to terminate the outer ends of the kiss cuts inwardly of the lateral edges of the decorative ribbon, to facilitate removal of the remaining portions outside the margins of the cuts, by peeling such remaining portions in one continuous strip. In either case, the removal of such remaining portions leaves the decorative elements secured to the underlying liner strip 14 by means of the narrow strips of pressure sensitive adhesive 12 provided at the outer portions of the pairs of design elements. The design elements thus may be packaged by forming rolls of the elongated ribbon of liner 14, and each decorative element then may be removed from the liner strip, one at a time, by disengaging the adhesive-coated portions 12 from the liner.

The interconnected pair of design elements then are bent along the transverse line of perforations 18 and the terminal portions of the pair of design elements are bent outward for securing the pressure sensitive adhesive tips 12 to an underlying surface, such as a package.

Figure 10:
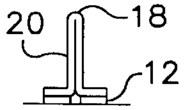
FIGS. 10, 11 and 12 are side elevations showing the decorative pop-up sticker of FIG. 8 secured to an underlying surface in various conditions of folding to three dimensional configurations.
Figure 11:
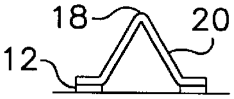
Figure 12:
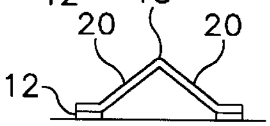
Figure 13:
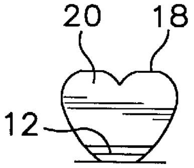
FIG. 13 is a front elevation of the decorative pop-up sticker shown in FIG. 11.

FIGS. 10, 11 and 12 illustrate various configurations achieved by bending the two interconnected halves along the transverse line of perforations to various angles. In FIG. 10 the two halves are secured together by adhesive over all or part of the back side of one or both halves. FIG. 13 is a front view of either side of the bent configuration of FIG. 11, as it is secured to a surface.

Although the design element illustrated in FIGS. 7–13 of the drawings is in the shape of a heart, it will be understood that the decorative pop-up sticker may have any desired peripheral configuration and the adhesive applied to areas other than the lateral margins. Examples are illustrated in FIGS. 14–23.

FIGS. 14–16 illustrate a decorative pop-up sticker in the form of butterflies 22 produced by multiple kiss cuttings along the length of decorative ribbon, in the manner described hereinbefore with reference to FIG. 7. The butterflies are shown in FIG. 14 in the same condition as the hearts in FIG. 8, i.e. with the portions of decorative ribbon outside the cut margins of the butterflies having been removed.

To form the butterfly pop-up sticker, a narrow strip of pressure sensitive adhesive 24 is applied to the underside of decorative ribbon, along the longitudinal centerline of the ribbon, and the ribbon bonded removably to an underlying ribbon of liner 26. The butterfly configurations then are produced by kiss cutting through the decorative ribbon, but not through the liner, after which the excess decorative ribbon is removed, leaving the butterfly designs retained on the liner by the underlying strip of adhesive (FIG. 15).

Each butterfly sticker may be removed from the ribbon of liner and secured by the underlying adhesive 24 to a gift wrapper or other desired surface 28. The wings of the butterfly then may be bent outward from such surface, along the center score or perforated line 30, to display the butterfly in a three-dimensional configuration, substantially symmetrical about the central bending line, as shown in FIG. 16. Internal interrupted kiss cuts may be provided to form wing segments 22' within the dimensions of the main wings that may be bent outward along the interrupted portion, in the manner described in my U.S. Pat. No. 5,691,023 to enhance the three dimensional appearance.

FIGS. 17–19 illustrate a decorative pop-up sticker of this invention in the form of a flower having a central portion 32 and peripherally extending petals 34. Score or perforation lines 36 are provided between the central portion 32 and petals 34 to enable bending the petals angularly upward from the central portion, to produce a three-dimensional configuration of the flower. As in the earlier embodiments, an elongated decorative ribbon is secured removably to an underlying strip of liner 38, by means of longitudinally spaced spots of pressure sensitive adhesive 40. Each of these spots of adhesive is positioned on the ribbon to define the center of the central portion 32, and kiss cutting of the decorative ribbon around that center produces the configuration of the flower. The decorative pop-up sticker may be removed from the liner 38 and secured to a gift wrapper or other desired surface 42, by means of the adhesive spot 40. The petals 34 then may be bent upward, as in FIG. 19, to create a three-dimensional flower configuration.

In FIG. 20 a rectangular decorative pop-up sticker 44 is formed by kiss-cutting decorative ribbon secured to a liner ribbon 46 by lateral strips of pressure sensitive adhesive 48. Four spaced score or perforated lines 50 define bending lines by which the sticker may be formed into an inverted U-shape, as shown in FIG. 21. The end tabs carrying the adhesive 48 may be secured to an underlying surface, to form a decorative pop-up sticker in the shape of an open-ended box. Two such pop-up stickers 44 may be stacked one within the other at 90° displacement, to form a closed cube 52 which may be decorated with alphabet letters in the manner of a child's toy block, as illustrated in FIG. 23. The cubic structure may form various other designs, and it may have an open top to form still other designs.

The toy block 52 in FIG. 23 may be formed by a one-piece blank 54 in the shape of a cross, as shown in FIG. 22. Laterally spaced lines of adhesive 56 and longitudinally spaced lines of adhesive 58 are deposited on the underside of the ribbon, as previously explained, and the ribbon kiss-cut to form the cross shape with the lines of adhesive adjacent the outer ends of the cross components. Score or perforated lines 60 also are formed in the ribbon at the inner ends of the cross extensions, to facilitate bending to the closed cube shape of FIG. 23.

It will be apparent to those skilled in the art that various changes may be made in the size, shape, type, number and arrangement of parts described hereinbefore. For example, the interconnected halves may be of the same peripheral contour, as are the hearts illustrated, or they may be of different peripheral contour. The underside of the ribbon may be colored correspondingly. The peripheral contour may form a border for internal artwork. The decorative pop-up designs may be made individually, of decorative material of various thicknesses. The only requirement is that the halves be interconnected at a common bend line. The perforations 18 defining the bend line may be replaced with a score line for the same purpose. These and other changes may be made, as desired, without departing from the spirit of this invention and the scope of the appended claims.

I claim:

1. A decorative pop-up sticker, comprising:

a) a decorative sheet having a predetermined peripheral contour capable of being bent on intermediate lines to form an inverted U with a pair of oppositely-facing, connected decorative sections, each with an outwardly bent tab, and b) adhesive on each of said outwardly bent tabs of the decorative sheet for attaching the sheet to a surface with the intermediate lines distal from said surface to form the inverted U.

2. The decorative pop-up sticker of claim 1 wherein the adhesive is pressure sensitive.

3. The decorative pop-up sticker of claim 1 wherein said intermediate lines are score or perforate lines.

4. The decorative pop-up sticker of claim 1 wherein said connected decorative sections are substantial duplicates in peripheral contour.

5. The decorative pop-up sticker of claim 1 wherein said outwardly bent tabs are configurate to attach the decorative sheet to generally planar surface.

6. A decorative pop-up sticker, comprising:

a) a decorative sheet having a predetermined peripheral contour capable of being bent on an intermediate line to form a plurality of connected decorative sections, and b) adhesive on at least a portion of the decorative sheet to attach the sheet to a surface with the decorative sections bent outwardly from the surface, wherein at least one of the decorative sections includes a nested decorative section capable of being bent outwardly from the decorative section.

7. A decorative pop-up sticker, comprising:

a) a decorative sheet having a predetermined peripheral contour capable of being bent on intermediate lines to form a block having an open end, the block including a pair of oppositely-facing, connected decorative sections, each with an outwardly bent tab, and b) adhesive on each of said outwardly bent tabs of the decorative sheet for attaching the sheet to a surface with the intermediate lines distal from said surface to form the block.

* * * * *